United States Patent
Riad et al.

(10) Patent No.: US 11,731,537 B2
(45) Date of Patent: Aug. 22, 2023

(54) PASSENGER SEAT ASSEMBLY WITH CHILD CAR SEAT RAIL SYSTEM

(71) Applicant: Honda Motor Co., Ltd., Tokyo (JP)

(72) Inventors: Yousuf S. Riad, Ostrander, OH (US); Kelly Michael Whalen, Worthington, OH (US); Michael J. Wilms, Marysville, OH (US); Mark David Bartlett, Dublin, OH (US); Wesley L. McClellan, Marysville, OH (US); Paul D. Nguyen, Plain City, OH (US); Susan L. Mostofizadeh, Worthington, OH (US); Anas Kachlan, Columbus, OH (US); Shane E. Platt, Strongsville, OH (US); Gabriel J. Smith, Kent, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 295 days.

(21) Appl. No.: 17/240,377

(22) Filed: Apr. 26, 2021

(65) Prior Publication Data

US 2022/0340054 A1 Oct. 27, 2022

(51) Int. Cl.
*B60N 2/28* (2006.01)
*B60N 2/02* (2006.01)
*B60N 2/30* (2006.01)

(52) U.S. Cl.
CPC ......... *B60N 2/2824* (2013.01); *B60N 2/2827* (2013.01); *B60N 2/305* (2013.01); *B60N 2002/0216* (2013.01)

(58) Field of Classification Search
CPC .... B60N 2/305; B60N 2/2824; B60N 2/2827; B60N 2/2869; B60N 2/2875;
(Continued)

(56) References Cited

U.S. PATENT DOCUMENTS

| 6,283,545 | B1 | 9/2001 | Ernst |
| 7,762,604 | B1* | 7/2010 | Lindsay ............ B60N 2/01583 |
| | | | 296/65.09 |

(Continued)

FOREIGN PATENT DOCUMENTS

| DE | 102008017199 | 10/2009 |
| DE | 102015010363 | 3/2016 |

(Continued)

*Primary Examiner* — Jason S Morrow
*Assistant Examiner* — Wenwei Zhuo
(74) *Attorney, Agent, or Firm* — Rankin, Hill & Clark LLP (57) ABSTRACT

A vehicle passenger seat assembly includes a passenger seat and a rail system. The passenger seat includes a seat base and a seat back connected to the seat base. The passenger seat is movable between a seated condition for accommodating a seated passenger and non-seated condition where the passenger seat is tilted forward in a front-rear direction of the vehicle about a forward end portion of the seat base. The rail system is mounted to the seat base and configured to have mounted thereto a child car seat. The rail system is configured to move the child car seat along a lateral direction of the passenger seat between at least two seating locations defined by the passenger seat. The rail system is movable independent of the passenger seat to a forward tilted position to allow for movement of the passenger seat between the seated condition and the non-seated condition.

20 Claims, 5 Drawing Sheets

(58) Field of Classification Search
CPC ............... B60N 2/2887; B60N 2/2893; B60N 2002/0216; A47D 1/103
USPC .................... 296/65.05, 65.13, 65.01, 65.06
See application file for complete search history.

(56) References Cited

U.S. PATENT DOCUMENTS

| | | | |
|---|---|---|---|
| 7,891,721 B2 | 2/2011 | Pesach | |
| 10,730,413 B1* | 8/2020 | Riad | .................... B60N 2/0806 |
| 2004/0178669 A1 | 9/2004 | Lady et al. | |
| 2009/0273215 A1* | 11/2009 | Barker | ................. B60N 2/2821 |
| | | | 297/253 |
| 2014/0327281 A1* | 11/2014 | Hou | ..................... B60N 2/2845 |
| | | | 297/217.1 |

FOREIGN PATENT DOCUMENTS

| | | |
|---|---|---|
| FR | 2917021 | 12/2008 |
| WO | 0121433 | 3/2001 |

* cited by examiner

PASSENGER SEAT ASSEMBLY WITH CHILD CAR SEAT RAIL SYSTEM

BACKGROUND

Child car seats are required for infants and small children traveling in vehicles. Many conventional child car seats are heavy and relatively difficult to install in the rear seat of a vehicle. In addition, because the space associated with the rear seat is limited, many parents often find it difficult to properly place the child car seat atop the rear seat of the vehicle. Obtaining access to the child car seat or the child often requires the parent to awkwardly position himself or herself inside the vehicle, and this awkward positioning can result in inconvenience to both the parent and the child car seated in the child car seat.

BRIEF DESCRIPTION

According to one aspect, a passenger seat assembly for a vehicle comprises a passenger seat and a rail system. The passenger seat includes a seat base and a seat back connected to the seat base. The passenger seat is movable between a seated condition for accommodating an associated seated passenger and non-seated condition where the passenger seat is tilted forward in a front-rear direction of the vehicle about a forward end portion of the seat base. The rail system is mounted to the seat base and configured to have mounted thereto an associated child car seat. The rail system is configured to move the associated child car seat along a lateral direction of the passenger seat between at least two seating locations defined by the passenger seat. The rail system is movable independent of the passenger seat to a forward tilted position to allow for movement of the passenger seat between the seated condition and the non-seated condition.

According to another aspect, a child car seat rail system for mounting to a passenger seat of a vehicle is provided. The passenger seat includes a seat base defining at least two seating locations and a seat back connected to the seat base. The passenger seat is movable between a seated condition for accommodating an associated seated passenger and non-seated condition where the passenger seat is tilted forward in a front-rear direction of the vehicle about a forward end portion of the seat base. The rail system comprises a slide rail for mounting to the seat base along a lateral direction of the passenger seat between the at least two seating locations and a platform slidably mounted to the slide rail for mounting of an associated child car seat and moving the associated child car seat along the lateral direction of the passenger seat between at least two seating locations. The rail system is movable independent of the passenger seat to a forward tilted position to allow for movement of the passenger seat between the seated condition and the non-seated condition.

According to another aspect, a passenger seat assembly for a vehicle comprises a passenger seat and a rail system. The passenger seat includes a seat base defining at least two seating locations and a seat back connected to the seat base. The passenger seat is movable between a seated condition for accommodating an associated seated passenger and non-seated condition where the passenger seat is tilted forward in a front-rear direction of the vehicle about a forward end portion of the seat base. The rail system includes a slide rail mounted to the seat base and extended in a lateral direction of the passenger seat between the at least two seating locations and a platform slidably mounted to the slide rail for mounting of an associated child car seat and moving the associated child car seat along the lateral direction of the passenger seat between at least two seating locations. The platform is mounted on a base support, and support pillars fixed to a forward portion of the base support include end portions pivotally coupled to the slide rail allowing movement independent of the passenger seat of the base support, the platform and the support pillars as a single rail component to a forward tilted position to allow for movement of the passenger seat between the seated condition and the non-seated condition.

DETAILED DESCRIPTION

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-4 schematically illustrate an exemplary passenger seat assembly 100 adapted for use in connection with a vehicle V having an increased cargo and passenger carrying capacity. Although, it should be appreciated that the passenger seat assembly 100 can be implemented in alternative type vehicles. With respect to a longitudinal, front-rear direction of the vehicle, the illustrated vehicle generally includes a first or front row seat 102 and a third or rear row seat 106. The exemplary passenger seat assembly 100 is depicted as comprising a second or middle row seat 108; although, this is not required. Each seat 102, 106, 108 is coupled to a floor 110 of the vehicle.

The front row seat 102 includes a seat base 116 for supporting a seated passenger (e.g., a driver) and a seat back 118 pivotally coupled to the seat base. The seat base 116 can be moveably mounted to the floor 110. Typically, the front seat 102 can be either a manually adjustable seat or can be provided with electric motors to provide automated adjustment and electronic control of the front seat. The rear row seat 106 includes a seat base 126 for supporting a seated passenger and a seat back 128 coupled to the seat base 126. The middle row seat 108 includes a seat base 130 and a seat back 132 connected to the seat base. As known and understood by those skilled in the art, the seat back 128, 132 of each rear row seat 106 and middle row seat 108 can be foldable over the seat base 126, 130 to increase a rear cargo area of the vehicle V. Further, aside from a lateral dimension, the middle row seat and rear row seat can be constructed similar to one another.

Figure 4:
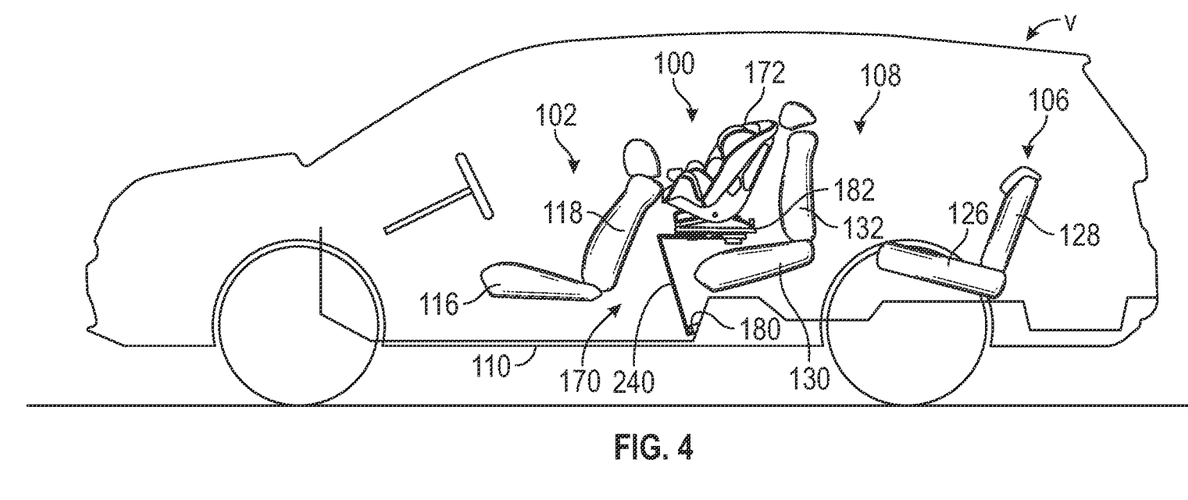
Figure 5:
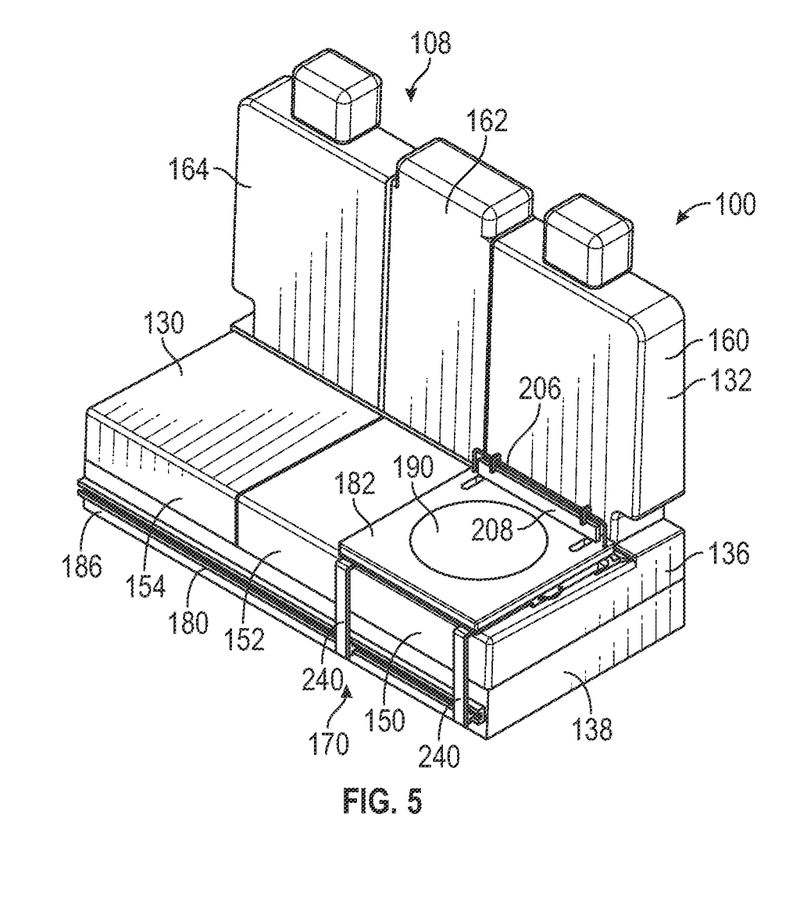
FIG. 5 is a schematic perspective view of the passenger seat assembly.
Figure 6:
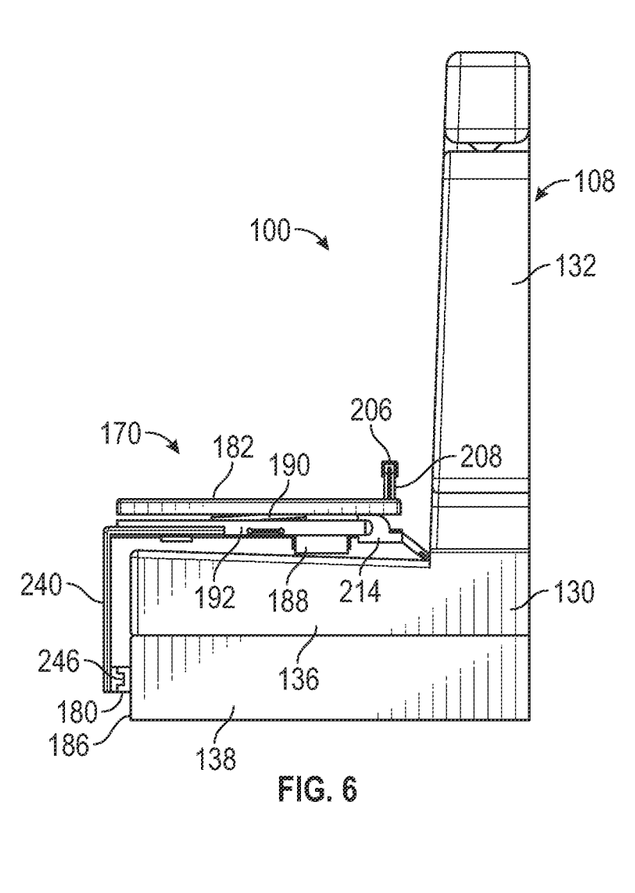
FIG. 6 is a side view of the passenger seat assembly of FIG. 5.

As shown in FIGS. 5 and 6, the seat base 130 of the second or middle row seat 108 has a cushion portion 136 and a support portion 138 for supporting the cushion portion. The support portion 138 can be mounted to the vehicle floor 110. According to one aspect, the middle row seat 108 is a split-bench/split back type seat, wherein the cushion portion 136 includes a first outboard cushion portion 150, a center cushion portion 152, and a second outboard cushion portion 154, and the seat back 132 includes a first outboard seat back portion 160, a center seat back portion 162, and a second outboard seat back portion 164. With this type of arrangement, the first outboard cushion portion 150 and the first outboard seat back portion 160 define a first outboard seat for a seated passenger (i.e., a first outboard seat seating location). The center cushion portion 152 and the center seat back portion 162 define a center seat for a seated passenger (i.e., a center seating location). And the second outboard cushion portion 154 and the second outboard seat back portion 164 define a second outboard seat for a seated passenger (i.e., a second outboard seating location). In FIG. 4, the middle row seat 108 is movable between a seated condition for accommodating a seated passenger and non-seated condition where the entire middle row seat 108 is tilted forward in a front-rear direction of the vehicle about a forward end portion of the seat base 130. It should also be appreciated that each of the first outboard seat, the center seat, and the second outboard seat described above can be independently movable between the seated condition and the non-seated condition.

Figure 1:
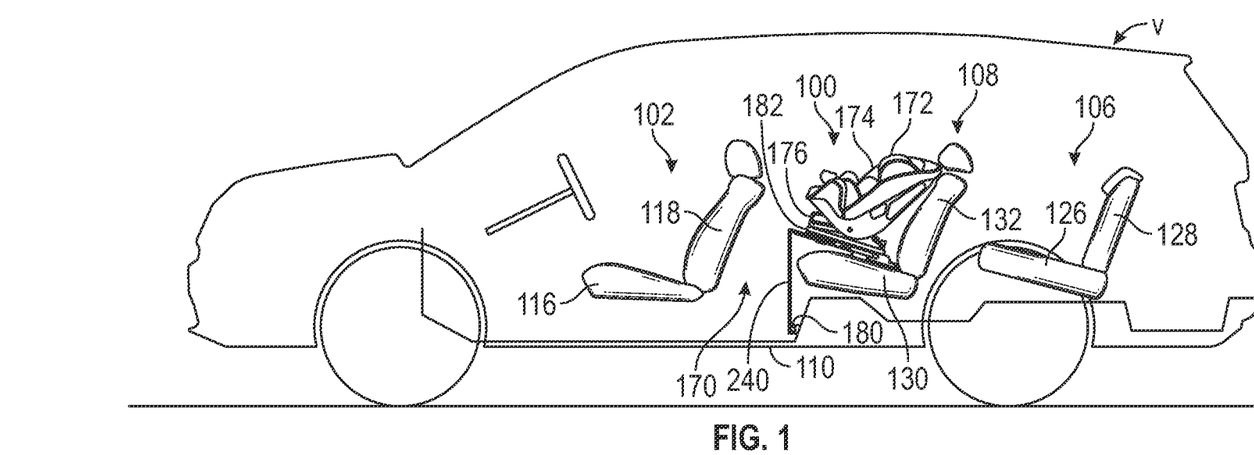
FIGS. 1, 2, 3 and 4 are schematic views of a vehicle including a passenger seat assembly according to the present disclosure, the passenger seat assembly including a passenger seat and an exemplary rail system mounted to the passenger seat for an associated child seat.
Figure 2:
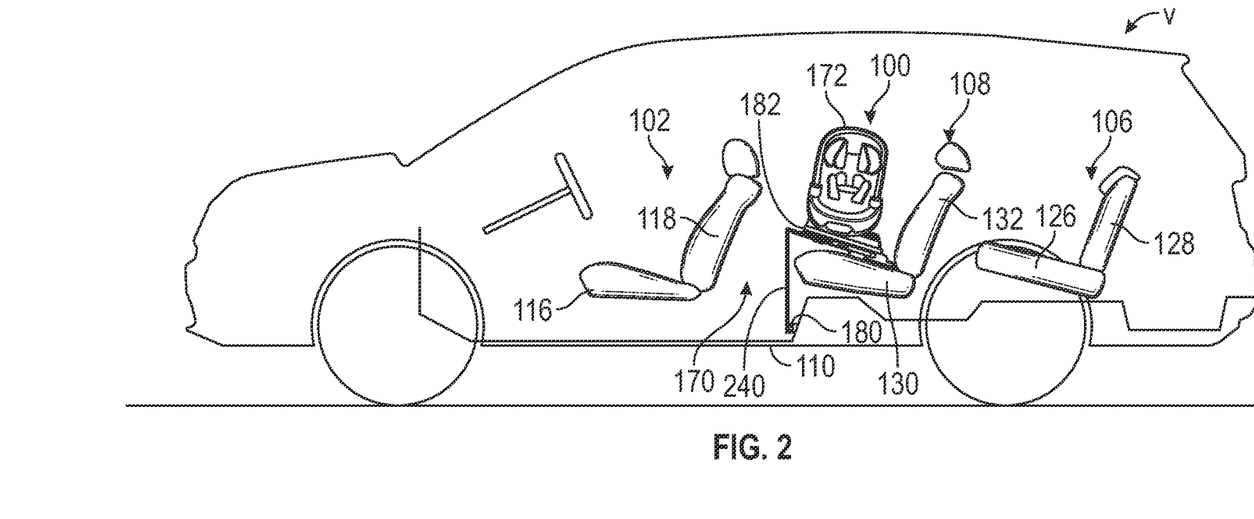
Figure 3:
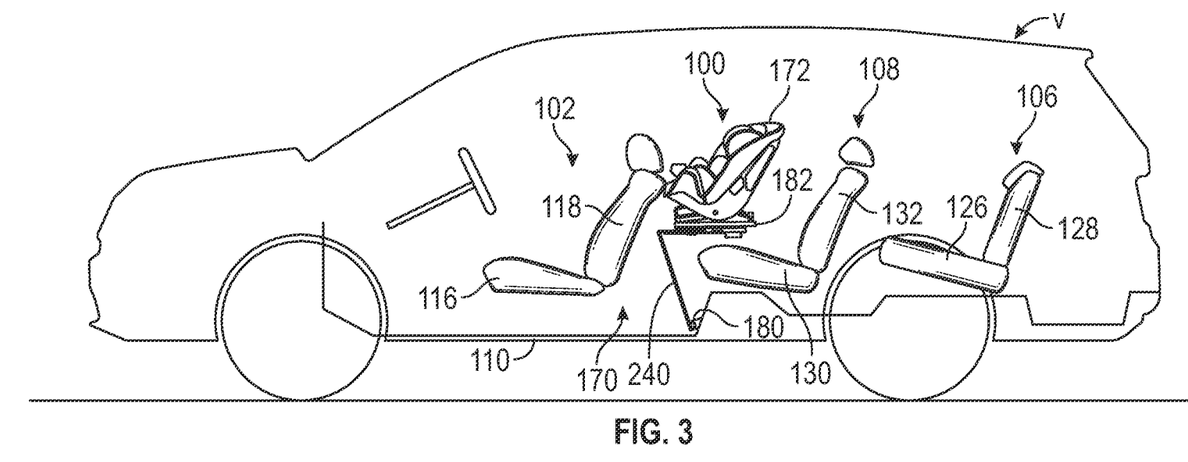

With reference back to FIGS. 1-4, the exemplary passenger seat assembly 100 comprises a rail system 170 mounted to the middle row seat 108 for mounting of an associated child car seat 172 and moving the child car seat along the lateral direction of the middle row seat 108 between at least two seating locations (i.e., between the first outboard seating location and at least one of the center seating location and the second outboard seating location). According to the present aspect, the rail system 170 is configured to move the child car seat 172 along the lateral direction between the first outboard seating location and the second outboard seating location (FIG. 5). The rail system 170 is also movable independent of the middle row seat 108 to a forward tilted position to allow for movement of the middle row seat 108 between the seated condition and the non-seated condition (FIGS. 3 and 4).

Although the child car seat 172 is illustrated herein in the form of a combined infant carrier 174 and support base 176, those skilled in the art will readily recognize that there are many other styles and types of child car seats that are provided depending on the desired seating arrangement and the different sizes, ages and weights of child occupants. Therefore it is to be understood that the child car seat 172 illustrated herein, and the use of the term "child car seat" throughout this disclosure and claims is to represent and identify any and all forms of child car seat arrangements.

Figure 8:
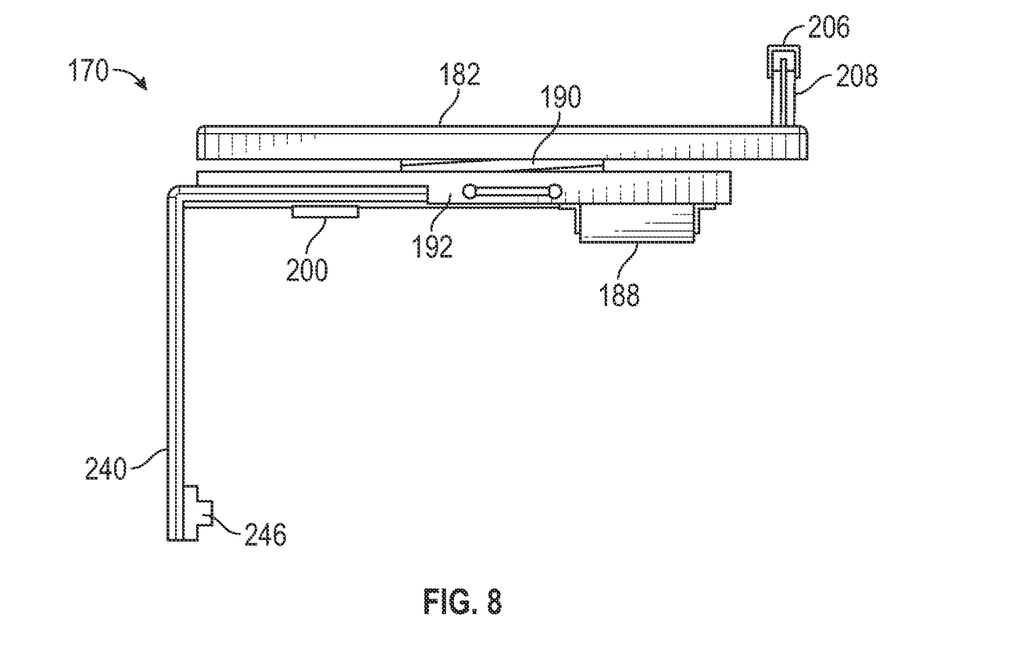
FIG. 8 is a side view of the rail system.

The exemplary rail system 170 includes a slide rail 180 and a platform 182 slidably mounted to the slide rail. The slide rail 180 can be mounted to the vehicle floor 110 (FIGS. 1-4) or mounted to a forward facing outer surface 186 of support portion 138 of the seat base 130 (FIGS. 5, 6 and 8). In FIG. 5, the slide rail 180 is extended in the lateral direction of the middle row seat 108 between the first outboard seating location and the second outboard seating location. The platform 182 is configured to have mounted thereto the child car seat 172 and is selectively movable along the slide rail 180 in a plane substantially parallel with respect to an upper surface of the cushion portion 136 of the seat base 130. Rollers 188 can be provided on an underside of the platform 182 to support the platform on the cushion portion 136. The platform 182 of the present disclosure includes a rotatable part 190 substantially centered on the platform, which can be in the form of a turntable adapted to rotate the platform 182 relative to a base support 192 provided beneath the platform 182. The rotatable part 190 provides the added ability to rotate the child car seat 172 (FIG. 2), which offers assistance in mounting the child car seat 172 to the platform and removing the child car seat from the vehicle.

It should be appreciated that telescopically extensible glide track members can be provided between the platform 182 and the base support 192 for lateral movement of the platform 182 between a between a secured position disposed over the base support 192 and a laterally extended position in which the child car seat 172 is extended laterally from base support 192. This allows the child car seat 172 when at one of the first and second outboard seating locations to be further extended at least partially through an adjacent door opening of the vehicle and supported in position substantially outside of the vehicle for loading and unloading. The glide track members can include outer track members mounted on the base support 192 and inner track members mounted on the platform 182 for supported movement telescopically into and out of the outer track members. The glide track members can laterally flank the rotatable part 190 and a coupling structure can be provided between the rotatable part 190 and the base support 192 to allow for releasable connection between the rotatable part and the base support. It should also be appreciated that the upper surface of the platform 182 can have a non-slip surface which increases the coefficient of friction between the child car seat 172 and the platform 182, and tends to reduce slippage between the child car seat 172 and the platform 182.

Figure 9:
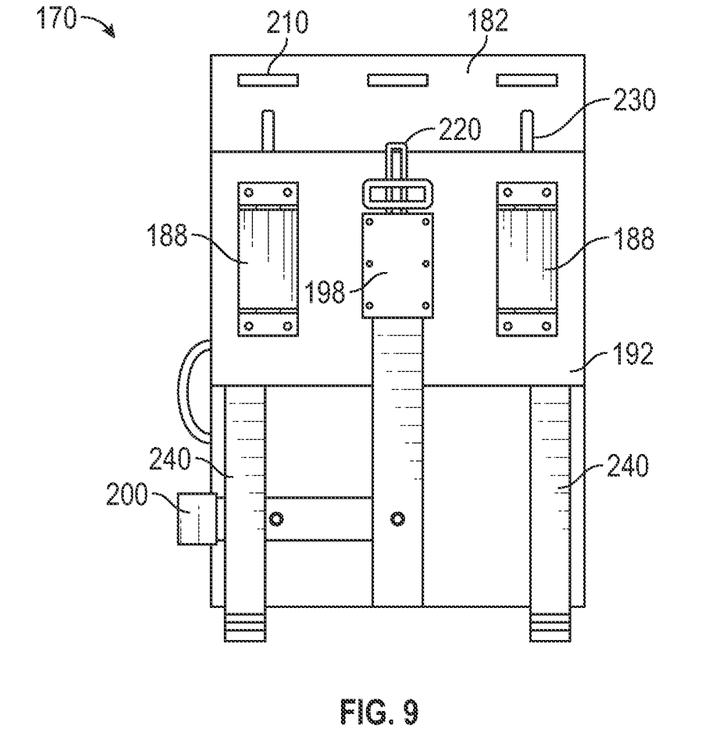
FIG. 9 is a bottom plan view of the rail system.

Further, in FIG. 9 the rail system 170 includes a lock device 198 mounted to the base support 192 for locking a rotational position of the platform 182 on the base support. The lock device 198 can be positioned between the rollers 188 and can be actuated by a lever 200. It should be appreciated that the lock device can be any known device adapted to prevent rotation of the platform. By way of example, the lock device 198 can include a brake or cam connected to the lever 200 which selectively engages or brakes the rotatable part 190 to stop its rotation and maintain its position relative to the base support 192. The lock device 198 can also be adapted to allow for indexing of the rotatable part 190 relative to the base support 192. By way of example, the lock device 198 can include a lock pin connected to the lever 200 to be selectively received in a bore of a plurality of bores provided on the rotatable part 190. By way of another example of indexing, the lock device 198 can include a pawl connected to the lever 200 to selectively engage teeth provided about a periphery of the rotatable part 190.

Figure 7:
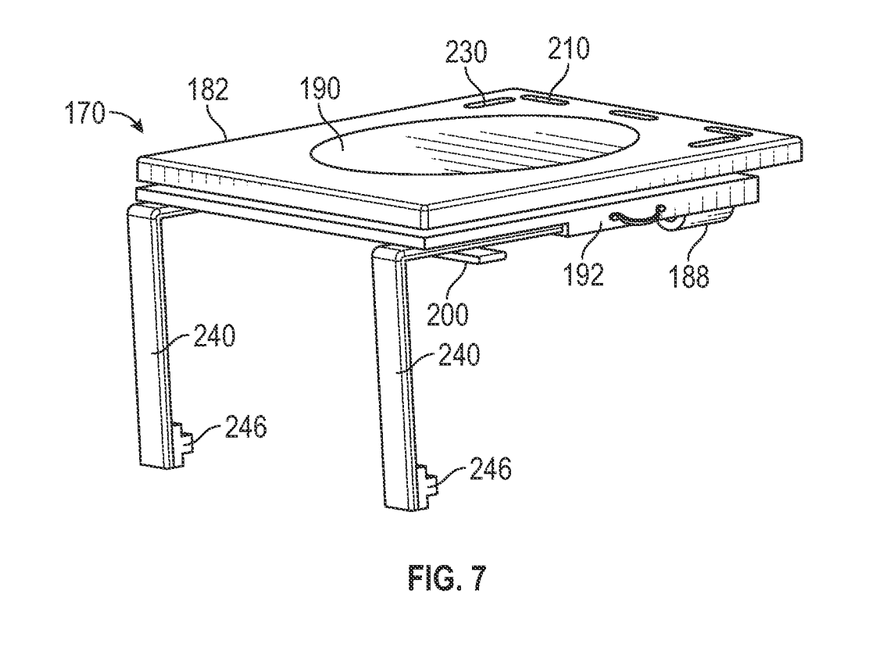
FIG. 7 is a perspective view of the rail system.
Figure 10:
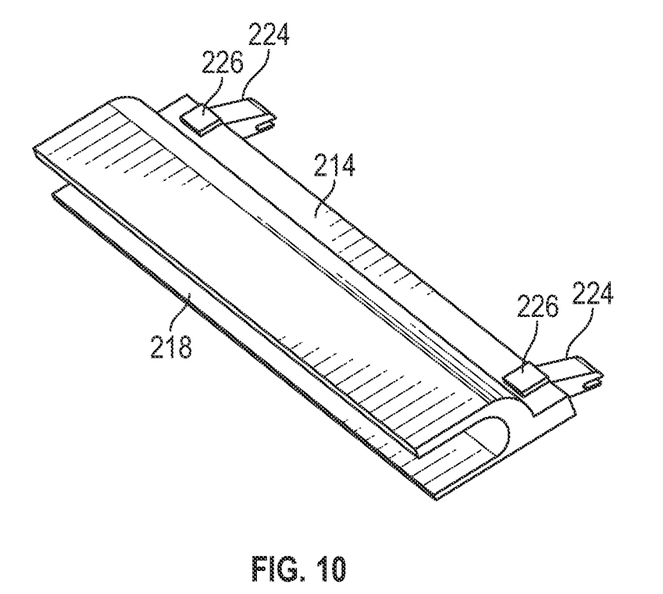
FIG. 10 is a perspective view of a latch support of the rail system.

To secure the child car seat 172 to the platform 182, the platform can include at least one anchor for attachment of a typical child car seat hook. In the depicted embodiment, the at least one anchor is defined by a support bar 206 provided on a rear support structure 208 attached to the platform 182, the support bar compatible with LATCH (Lower Anchors and Tethers for Children)-compliant child car seats. The rear support structure 208 can serve as an abutment wall for the secured child car seat 172, thereby providing stability to the mounted child car seat. As shown, the rear support structure 208 is a separate component that is removable from the platform 182. To this end, the platform can be provided with openings 210 along a rear end portion, and the rear support structure 208 can include, for example, engaging feet (not shown) sized to be secured within the openings 210. With the child car seat 172 attached to the rear support structure 208, the rail system 170 can further be provided with a separate latch support 214 (FIGS. 6 and 10) configured to secure the platform 182 at each of the seating locations on the seat base 130 via engagement with known child car seat anchors provided on the middle row seat 108. The latch support 214 can be removably mounted to one of the platform and the base support 192, and in FIG. 6 the latch support is mounted to the base support 192 so as to be located beneath the rear support structure 208. FIG. 10 shows the latch support 214 to include an elongated channel 218 sized to receive the base support 192. A latch, or similar attachment device, can be located within the channel 218 for connection to, for example, a hook 220 provided on the base support. The latch support 214 further includes anchor latches 224 for connection to the known child car seat anchors, and release buttons 226 can be provided to disengage the anchor latches 224. However, because the rear support structure 208 is removable from the platform 182, the platform is adapted to allow the child car seat 172 to be directly secured to the known child car seat anchors provided on the middle row seat 108. In FIG. 7, additional openings 230 are provided on the platform 182, the openings 230 sized to allow child car seat hooks to extend therethrough for connection to the known child car seat anchors.

With reference to FIGS. 5-8, the platform 182 is rotatably mounted on the base support 192, and support pillars 240 fixed to the base support interconnect a forward portion of the base support and the slide rail 180. End portions of the support pillars 240 are provided with rollers 246 that are received by the slide rail 180. It should be appreciated that a stop device can be provided on one of the slide rail 180 and the support pillars 240 to prevent sliding movement of the rollers 246, thereby further securing the platform 182 at each of the first outboard seating location, the center seating location and second outboard seating location. For example, the stop device can includes lock pins provided on the support pillars 240 for selectively engaging the slide rail 180. According to the present disclosure, the support pillars 240 are further pivotally connected to the slide rail 180 about a lateral axis (an axis extended in the lateral direction of the middle row seat 108). As shown in FIGS. 1-4, this allows the base support 192, with the platform 182 and the support pillars 240 to be movable as a single rail component to the forward tilted position relative to the slide rail 180. Therefore, the rail system 170 is movable independent of the middle row seat 108 to a forward tilted position to allow for movement of the middle row seat 108 between the seated condition (FIGS. 1 and 2) and the non-seated condition (FIGS. 3 and 4) to allow for access to the rear row seat 106.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A passenger seat assembly for a vehicle comprising:
   a passenger seat including a seat base and a seat back connected to the seat base, the passenger seat movable between a seated condition for accommodating an associated seated passenger and non-seated condition where the passenger seat is tilted forward in a front-rear direction of the vehicle about a forward end portion of the seat base; and
   a rail system mounted to the seat base and configured to have mounted thereto an associated child car seat, the rail system configured to move the associated child car seat along a lateral direction of the passenger seat between at least two seating locations defined by the passenger seat, the rail system is movable independent of the passenger seat to a forward tilted position to allow for movement of the passenger seat between the seated condition and the non-seated condition.

2. The passenger seat assembly of claim 1, wherein the rail system includes a slide rail mounted to the seat base and extended in the lateral direction between the at least two seating locations and a platform slidably mounted to the slide rail, the platform configured to have mounted thereto the associated child car seat.

3. The passenger seat assembly of claim 2, wherein the platform includes at least one anchor for attachment of the associated child car seat to the platform.

4. The passenger seat assembly of claim 3, including a rear support structure mounted to the platform, the at least one anchor provided on the rear support structure.

5. The passenger seat assembly of claim 2, wherein a latch support is mounted to the platform, the latch support configured to secure the platform at each of the at least two seating locations on the seat base.

6. The passenger seat assembly of claim 5, wherein the latch support is configured for attachment to child car seat anchors provided on the on the passenger seat.

7. The passenger seat assembly of claim 2, wherein the platform is mounted on a base support, and support pillars fixed to the base support interconnect a forward portion of the base support and the slide rail, wherein the base support and the support pillars are movable as a single rail component to the forward tilted position relative to the slide rail.

8. The passenger seat assembly of claim 7, wherein the support pillars are pivotally connected to the slide rail.

9. The passenger seat assembly of claim 7, wherein the platform is rotatably mounted on the base support, and further including a lock device for locking a rotational position of the platform on the base support.

10. The passenger seat assembly of claim 2, wherein at least one roller provided on an underside of the platform supports the platform on a seating surface of the seat base.

11. The passenger seat assembly of claim 2, wherein the seat base has a cushion portion and a support portion for supporting the cushion portion, the slide rail mounted to a forward facing outer surface of the support portion.

12. A child car seat rail system for mounting to a passenger seat of a vehicle, the passenger seat including a seat base defining at least two seating locations and a seat back connected to the seat base, the passenger seat movable between a seated condition for accommodating an associated seated passenger and non-seated condition where the passenger seat is tilted forward in a front-rear direction of the vehicle about a forward end portion of the seat base, the rail system comprising:
   a slide rail for mounting to the seat base along a lateral direction of the passenger seat between the at least two seating locations and a platform slidably mounted to the slide rail for mounting of an associated child car seat and moving the associated child car seat along the lateral direction of the passenger seat between at least two seating locations, wherein the rail system is movable independent of the passenger seat to a forward tilted position to allow for movement of the passenger seat between the seated condition and the non-seated condition.

13. The rail system of claim 12, including a rear support structure mounted to the platform, and at least one anchor for attachment of the associated child car seat to the platform is provided on the rear support structure.

14. The rail system of claim 12, wherein a latch support is mounted to the platform for securing the platform at the at least two seating locations.

15. The rail system of claim 14, wherein the latch support is configured for attachment to associated child car seat anchors provided on the on the passenger seat.

16. The rail system of claim 12, wherein the platform is mounted on a base support, and support pillars fixed to a forward portion of the base support include end portions pivotally coupled to the slide rail allowing movement of the base support and the support pillars as a single rail component to the forward tilted position.

17. The rail system of claim 16, wherein the platform is rotatably mounted on the base support, and further including a lock device for locking a rotational position of the platform on the base support.

18. The rail system of claim 12, wherein at least one roller is provided on an underside of the platform for supporting the platform on an associated seating surface of the seat base.

19. A passenger seat assembly for a vehicle comprising:
a passenger seat including a seat base defining at least two seating locations and a seat back connected to the seat base, the passenger seat movable between a seated condition for accommodating an associated seated passenger and non-seated condition where the passenger seat is tilted forward in a front-rear direction of the vehicle about a forward end portion of the seat base; and
a rail system including a slide rail mounted to the seat base and extended in a lateral direction of the passenger seat between the at least two seating locations and a platform slidably mounted to the slide rail for mounting of an associated child car seat and moving the associated child car seat along the lateral direction of the passenger seat between at least two seating locations, wherein the platform is mounted on a base support, and support pillars fixed to a forward portion of the base support include end portions pivotally coupled to the slide rail allowing movement independent of the passenger seat of the base support, the platform and the support pillars as a single rail component to a forward tilted position to allow for movement of the passenger seat between the seated condition and the non-seated condition.

20. The passenger seat assembly of claim 19, including:
a rear support structure mounted to the platform, wherein at least one anchor for attachment of the associated child car seat to the platform is provided on the rear support structure; and
a latch support mounted to the platform for engagement with child car seat anchors provided on the on the passenger seat to lock the platform at the at least two seating locations of the passenger seat.

* * * * *